(12) United States Patent
Ishii et al.

(10) Patent No.: US 6,321,606 B1
(45) Date of Patent: Nov. 27, 2001

(54) APPARATUS FOR CALCULATING TORQUE GENERATED BY INDUCTION MOTOR

(75) Inventors: Shinichi Ishii, Saitama; Hirokazu Tajima, Tokyo, both of (JP)

(73) Assignee: Fuji Electric Co., Ltd., Kawasaki (JP)

( * ) Notice: Subject to any disclaimer, the term of this patent is extended or adjusted under 35 U.S.C. 154(b) by 0 days.

(21) Appl. No.: 09/349,259

(22) Filed: Jul. 8, 1999

(30) Foreign Application Priority Data

Jul. 22, 1998 (JP) ................................................. 10-206341

(51) Int. Cl.$^7$ ........................................................ G01L 3/02
(52) U.S. Cl. ................................................... 73/862.193
(58) Field of Search ....................... 73/862.193; 318/800, 318/807, 808

(56) References Cited

U.S. PATENT DOCUMENTS

| | | | | |
|---|---|---|---|---|
| 4,450,398 | * | 5/1984 | Bose | 318/803 |
| 5,341,081 | * | 8/1994 | Yamada | 318/800 |
| 5,594,670 | * | 1/1997 | Yamamoto | 364/571.01 |
| 5,811,956 | * | 9/1998 | Yamamoto | 318/801 |
| 5,973,474 | * | 10/1999 | Yamamoto | 318/801 |

* cited by examiner

*Primary Examiner*—Benjamin R. Fuller
*Assistant Examiner*—Jewel V. Thompson
(74) *Attorney, Agent, or Firm*—Kanesaka & Takeuchi (57) ABSTRACT

The apparatus calculates a torque that an induction motor generates while considering an iron loss even in a boosting state for exceeding the rated excitation. The calculation is based on a reference voltage value fed to an inverter for driving the induction motor, a q-axis current component and a d-axis current component resolved from a detected current of the induction motor on a rotating coordinate system, a primary resistance of the induction motor and a primary angular frequency. The apparatus includes an iron loss calculator that calculates the iron loss of the induction motor based on hysteresis characteristics of the stator core, a divider that divides the calculated iron loss by the primary angular frequency and an adder that calculates the generated torque by subtracting the result of the division from the torque calculated without considering the iron loss.

6 Claims, 8 Drawing Sheets

APPARATUS FOR CALCULATING TORQUE GENERATED BY INDUCTION MOTOR

BACKGROUND OF THE INVENTION AND RELATED ART STATEMENT

The present invention relates to an apparatus for calculating torque generated by an induction motor (hereinafter referred to as an "induction machine") driven by a PWM inverter.

According to the prior art, torque generated by an induction machine is obtained for controlling the induction machine from the vector product of the primary magnetic flux vector and the primary current vector of the induction machine as described in "Torque Limited Control for General Purpose Inverter" (1990 NATIONAL CONVENTION RECORD I.E.E. JAPAN, No. 579).

According to this method, however, since the method does not consider an iron loss of the induction machine, a large error may occur in the calculated result in the boosting state in that a reference voltage larger than usual is set with respect to a reference angular frequency, i.e. V/F setting exceeding the rated excitation.

As explained above, torque that an induction motor generates is obtained from the vector product of the primary magnetic flux vector and the primary current vector of the induction machine as described by the following equation (1). Also, the primary magnetic flux vector is calculated based on the primary voltage vector, primary current vector and primary resistance value, as shown by the equation (2).

$$\tau = \vec{\phi}_1 \times \vec{i}_1 \tag{1}$$

$$\vec{\phi}_1 = \int (\vec{v}_1 - r_1 \cdot \vec{i}_1) \cdot dt \tag{2}$$

The quantities in equations (1) and (2) are as follows.

$\vec{i}_1$: primary current vector $\vec{\phi}_1$: primary magnetic flux vector $\vec{v}_1$: primary voltage vector $r_1$: primary resistance value The following equation (3) is obtained by solving equations (1) and (2) on the rotating coordinate system (d-q axes coordinate system), rotating with the rotor of the induction machine, in the steady state.

$$\tau = \varphi_{1d} \cdot i_{1q} - \varphi_{1q} \cdot i_{1d}$$

$$= \{(v_{1q} \cdot i_{1q} + v_{1d} \cdot i_{1d}) - r_1(i_{1q}^2 + i_{1d}^2)\}/\omega_1 \tag{3}$$

In equation (3), $\omega_1$ represents a primary angular frequency. The following equations (4a) and (4b) are obtained from equation (3).

$$\phi_{1d} = (v_{1q} - r_1 \cdot i_{1q})/\omega_1 \tag{4a}$$

$$\phi_{1q} = (r_1 \cdot i_{1d} - v_{1d})/\omega_1 \tag{4b}$$

The numerator on the right side of equation (3) is a formula for obtaining electric power by subtracting the copper loss from electric power inputted to the induction machine. Therefore, this formula does not include so-called iron loss, that is the loss caused by the stator core.

In other words, since equation (3) does not consider the iron loss, a large error may occur in the calculated result in the boosting state in that a reference voltage larger than usual is set with respect to a reference angular frequency, i.e. V/F setting exceeding the rated excitation.

In view of the foregoing, it is an object of the invention to provide a calculating apparatus that facilitates calculating the torque generated by an induction motor in considering the iron loss.

SUMMARY OF THE INVENTION

The right side of equation (3) calculates torque $\tau$ by dividing the result (secondary input) of subtracting the primary copper loss $\{r_1(i_{1q}^2 + i_{1d}^2)\}$ from the inputted electric power $(v_{1q} \cdot i_{1q} + v_{1d} \cdot i_{1d})$ by the primary angular frequency $\omega_1$.

Equation (3) may be rewritten to the following equation (5), in that $P_o$ represents the secondary input (synchronous watt).

$$\tau = P_o/\omega_1 \tag{5}$$

The following equation (6) shows the relation of the inputted electric power P, secondary input $P_o$, copper loss $W_c$ and iron loss $W_i$. Equation (6) neglects the mechanical loss.

$$P = P_o + W_c + W_i \tag{6}$$

From equations (5) and (6), the torque that the induction machine generates is expressed by the following equation (7).

$$\tau = (P - W_c - W_i)/\omega_1$$

$$= \{(V_{1q} \cdot i_{1q} + v_{1d} \cdot i_{1d}) - r_1 \cdot (i_{1q}^2 + i_{1d}^2) - W_i\}/\omega_1$$

$$= \varphi_{1d} \cdot i_{1q} - \varphi_{1q} \cdot i_{1d} - W_i/\omega_1 \tag{7}$$

The iron loss $W_i$ is expressed by the following equation (8). Hysteresis loss $W_h$ and eddy current loss $W_e$ in equation (8) are expressed by the following equations (9) and (10), respectively.

$$W_i = W_h + W_e \tag{8}$$

$$W_h = \sigma_h \cdot f \cdot B_m^2 \tag{9}$$

$$W_e = \sigma_e \cdot d^2 \cdot f^2 \cdot B_m^2 \tag{10}$$

The quantities in equations (9) and (10) are as follows.

f: primary frequency $B_m$: maximum value of magnetic flux density $\sigma_h$: constant determined by a core material $\sigma_e$: constant determined by resistivity of a core d: thickness of the core Thus, the torque generated by an induction machine is calculated by using equation (7) that considers the iron loss of the induction machine.

The present invention is based on that the torque $\tau$ generated by the induction machine is obtained by dividing the secondary input $P_o$ by the primary angular frequency $\omega_1$. The secondary input $P_o$ is calculated by subtracting the copper loss $W_c$ and the iron loss $W_i$ from the inputted electric power P. By dividing the secondary input $P_o$ by the primary angular frequency $\omega_1$, the torque generated by the induction machine is precisely calculated while considering the iron loss.

In other words, the generated torque is calculated by subtracting the result of the division that divides the iron loss $W_i$ by the primary angular frequency $\omega_1$ from the calculated torque using the foregoing equation (3), that does not consider the iron loss.

According to an aspect of the invention, there is provided an apparatus for calculating torque that an induction motor generates, based on a reference voltage value fed to an inverter that drives the induction motor, a q-axis current component and a d-axis current component resolved from the detected current of the induction motor on the rotating coordinate system, a primary resistance of the induction motor and a primary angular frequency. The apparatus includes an iron loss calculator that calculates an iron loss of the induction motor based on hysteresis characteristics of a stator core of the induction motor; a divider that divides the calculated iron loss by the primary angular frequency; and an adder that calculates the generated torque by subtracting the result of the division from the torque calculated without considering the iron loss.

According to another aspect of the invention, there is provided an apparatus for calculating torque that an induction motor generates, based on a q-axis voltage component and a d-axis voltage component resolved from an output voltage of an inverter driving the induction motor on the rotating coordinate system, a q-axis current component and a d-axis current component resolved from the detected current of the induction motor on the rotating coordinate system, a primary resistance of the induction motor and a primary angular frequency. The apparatus includes an iron loss calculator that calculates an iron loss of the induction motor based on hysteresis characteristics of the stator core of the induction motor; a divider that divides the calculated iron loss by the primary angular frequency; and an adder that calculates the generated torque by subtracting the result of the division from the torque calculated without considering the iron loss.

The rotating coordinate system used herein is a d-q axes rotating coordinate system using as a reference axis a reference vector position obtained by integrating a primary angular frequency.

Advantageously, the iron loss calculator further calculates an eddy current loss based on characteristics of an eddy current flowing through the stator core of the induction motor and calculates the iron loss using the calculated eddy current loss.

Advantageously, the iron loss calculator further calculates a hysteresis loss and eddy current loss due to carrier frequency of the inverter, and calculates the iron loss using the calculated hysteresis loss and eddy current loss.

DETAILED DESCRIPTION OF PREFERRED EMBODIMENTS

Now the present invention will be explained hereinafter with reference to the accompanying drawings which illustrate the preferred embodiments of the invention.

Figure 1:
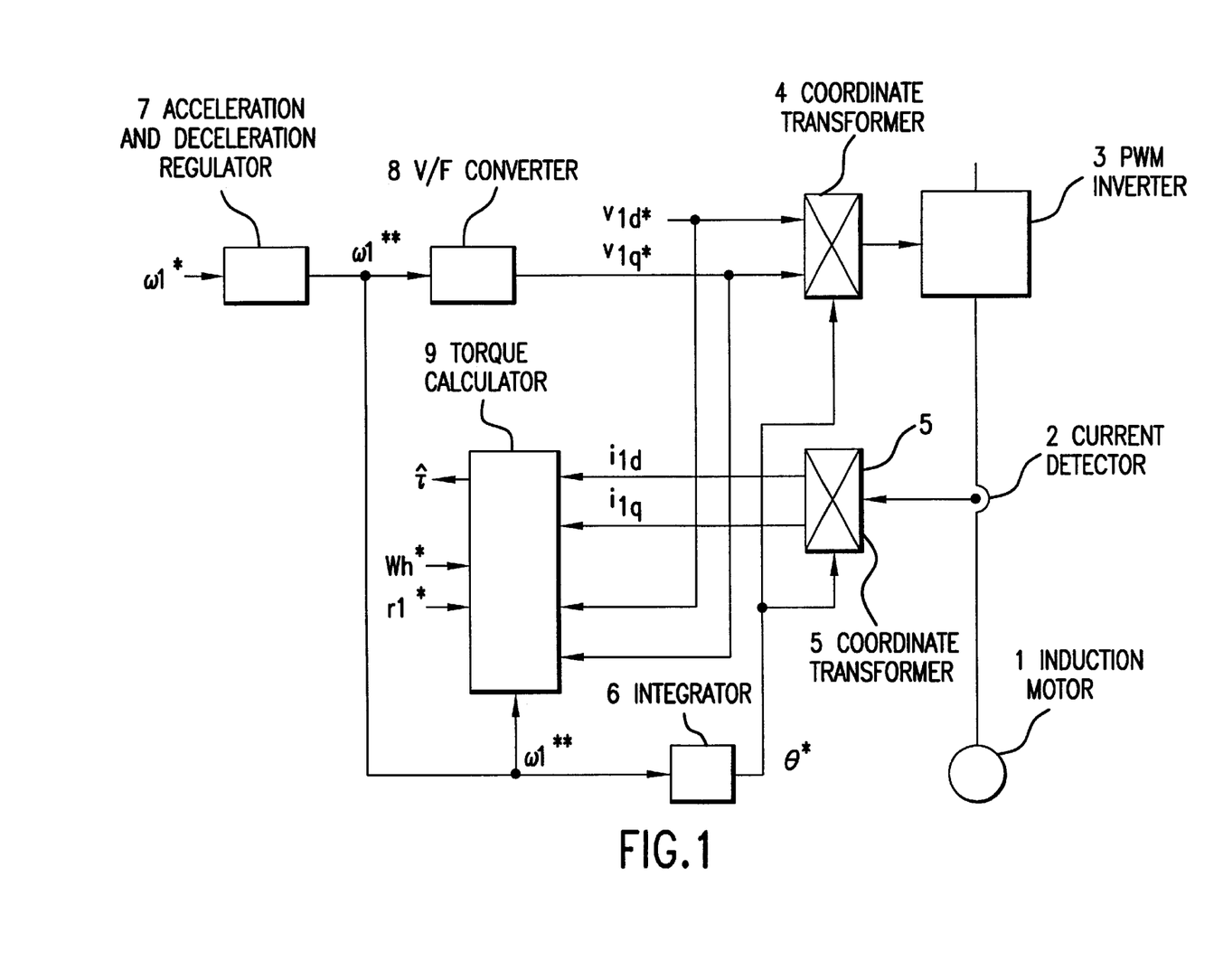
FIG. 1 is a block diagram of a controlling apparatus for controlling an induction motor according to a first embodiment of the invention.

FIG. 1 is a block diagram of a controlling apparatus for controlling an induction motor. Referring now to FIG. 1, a set value of a primary angular frequency $\omega_1^*$ is inputted to an acceleration and deceleration regulator 7 and converted to a reference primary angular frequency $\omega_1^{}$ for the electric power that a PWM inverter 3 outputs. The reference primary angular frequency $\omega_1^{}$ is fed to a V/F converter 8, an integrator 6 and a torque calculator 9 according to a first embodiment of the invention.

The V/F converter 8 generates a reference voltage value $v_{1q}^*$ corresponding to the reference primary angular frequency $\omega_1^{**}$. The reference voltage value $V_{1q}^*$ is inputted to a coordinate transformer 4. The integrator 6 calculates a reference vector position $\theta^*$ based on the reference primary angular frequency $\omega_1^{**}$. The reference vector position $\theta^*$ is inputted to the coordinate transformer 4 and another coordinate transformer 5.

The coordinate transformer 4 calculates an output voltage value from a reference voltage value $v_{1d}^*$, the reference voltage value $v_{1q}^*$ and the reference vector position $\theta^*$, and feeds the calculated output voltage value to the PWM inverter to make the PWM inverter generate a voltage. An induction motor 1 is driven by this voltage. The current of the induction motor 1 is detected by a current detector 2. The coordinate transformer 5 resolves the detected current to a q-axis current component $i_{1q}$ (torque current component) same in phase with the reference voltage value $v_{1q}^*$ and a d-axis current component $i_{1d}$ (magnetization current component) perpendicular to the q-axis current component.

Namely the q-axis and d-axis used as the q-axis current component and d-axis current component are indicated in a d-q axis rotating coordinate system using as a reference axis a reference vector position obtained by integrating the primary angular frequency, as shown in FIG. 1.

The resolved current components $i_{1q}$, $i_{1d}$, reference voltage values $v_{1q}^*$, $v_{1d}^*$, reference primary angular frequency $\omega_1^{**}$, primary resistance $r_1^*$ of the induction motor 1 and reference hysteresis loss $W_h^*$ are inputted to the torque calculator 9. The torque calculator 9 calculates the torque that the induction motor 1 generates in the following way.

Figure 2:
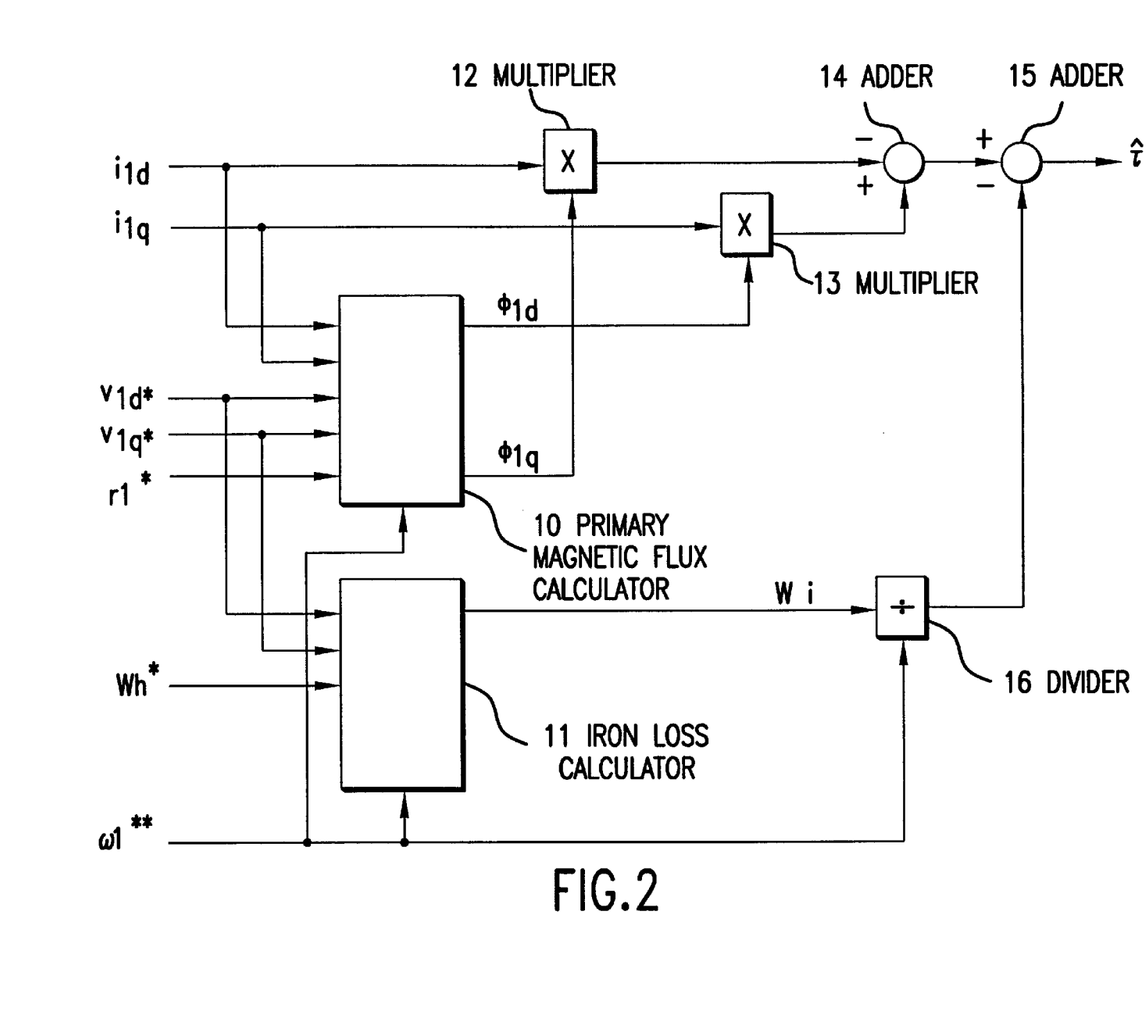
FIG. 2 is a block diagram of a torque calculator for calculating the torque generated by the induction motor according to the first embodiment of the invention.

FIG. 2 is a block diagram of the torque calculator 9 for calculating the torque generated by the induction motor in FIG. 1. Referring now to FIG. 2, the resolved current components $i_{1q}$, $i_{1d}$, the reference voltage values $v_{1q}^*$, $v_{1d}^*$, the reference primary angular frequency $\omega_1^{**}$ and the primary resistance $r_1^*$ of the induction motor 1 are inputted to a primary magnetic flux calculator 10. The primary magnetic flux calculator 10 obtains primary magnetic flux components $\phi_{1d}$ and $\phi_{1q}$ by calculating the foregoing equations (4a) and (4b).

An iron loss calculator 11 obtains the hysteresis loss $W_h$ by calculating the foregoing equation (9). The maximum magnetic flux density $B_m$ in equation (9) is obtained from the ratio of the reference voltage $v_1^*$ and the primary frequency f. $v_1^*$ is the absolute value of the vector sum of the vector components $v_{1q}^*$, $v_{1d}^*$. Accordingly, $B_m^2=\{(v_{1q}^*)^2+(v_{1d}^*)^2\}/f^2$. Reference hysteresis loss $W_h^*$ is the value of hysteresis loss $W_h$ when the variables $B_m$ and f are both 1 (p.u.(per unit)), and consequently, corresponds to the constant $\sigma_h$.

In the first embodiment, it is assumed that the iron loss $W_i$ is equal to the hysteresis loss $W_h$ ignoring the eddy current loss $W_e$ in equation (8).

A divider 16 calculates the third term or section on the right side of equation (7) by dividing the iron loss $W_i$, that is the hysteresis loss $W_h$ in this embodiment, by the reference primary angular frequency $\omega_1^{**}$.

The first term on the right side of equation (7) is calculated by a multiplier 12. The second term on the right side of equation (7) is calculated by a multiplier 13. An adder 14 adds the outputs of the multipliers 12 and 13. The estimated value of the torque $\tau$ that the induction machine generates is calculated by subtracting the output of a divider 16 from the output of the adder 14, that is the torque calculated from equation 3 that does not consider the iron loss.

Figure 3:
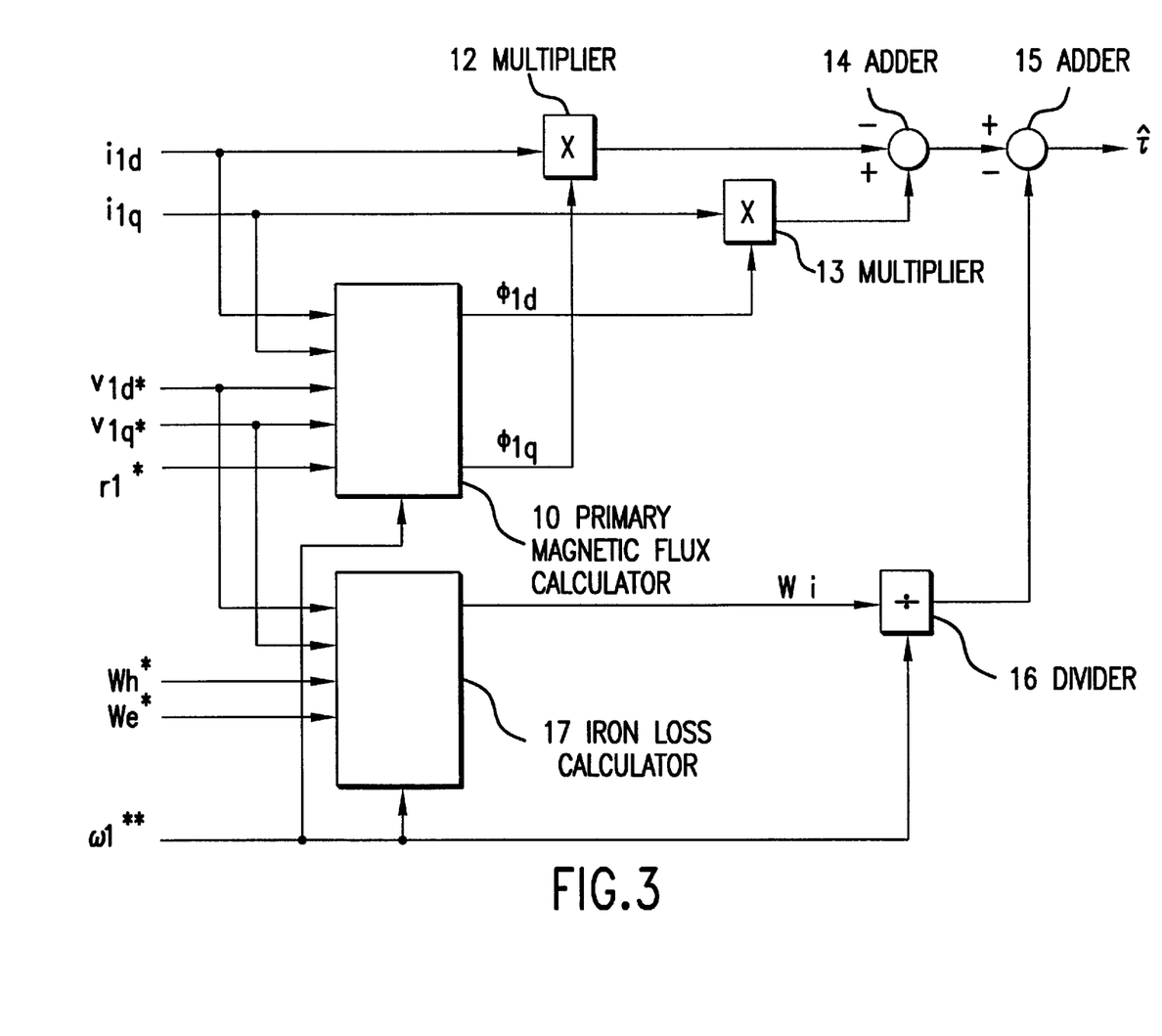
FIG. 3 is a block diagram of a torque calculator for calculating the torque generated by the induction motor according to a second embodiment of the invention.

FIG. 3 is a block diagram of a torque calculator for calculating the torque generated by the induction motor according to a second embodiment of the invention. In the following, duplicated explanations of the constituent parts same as those in FIG. 2 will be omitted for the sake of simplicity.

Referring now to FIG. 3, this torque calculator considers the eddy current loss $W_e$. The eddy current loss is calculated from equation 10. The maximum value of the magnetic flux density $B_m$ is obtained in the similar manner as in the first embodiment. An iron loss calculator 17 calculates the iron loss $W_i$ from equation 8. Reference eddy current loss $W_e^*$ corresponds to the constant $\sigma_e$ in the same way as the relation between reference hysteresis loss $W_h$ and constant $\sigma_h$.

Figure 4:
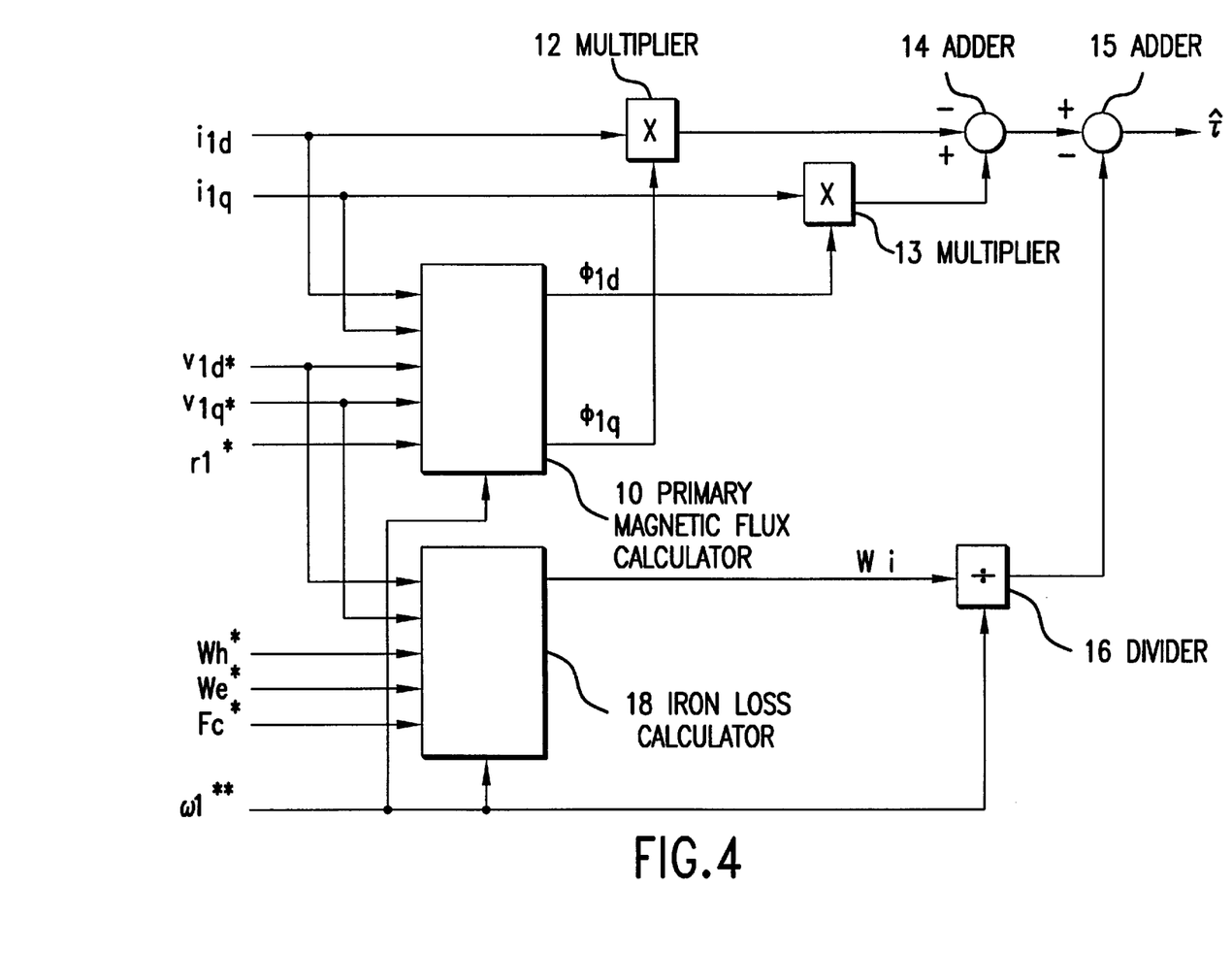
FIG. 4 is a block diagram of a torque calculator for calculating the torque generated by the induction motor according to a third embodiment of the invention.

FIG. 4 is a block diagram of a torque calculator for calculating the torque generated by the induction motor according to a third embodiment of the invention.

Referring now to FIG. 4, this torque calculator includes an additional calculator for calculating the iron loss due to the carrier frequency $f_c$ (hereinafter referred to as "carrier loss").

Since the iron loss $W_i$ is obtained, as equation (8) describes, by using the hysteresis loss $W_h$ in equation (9) and the eddy current loss $W_e$ in equation (10), a frequency for calculating the carrier loss is obtained from the primary frequency f and the modulation ratio, that is the ratio of the carrier frequency $f_c$ and the primary frequency f. The maximum value of the magnetic flux density $B_m$ is calculated by using the frequency for calculating the carrier loss and higher harmonics voltage component obtained from the modulation ratio. An iron loss calculator 18 calculates the iron loss $W_1$ conducting the above described calculations.

Figure 5:
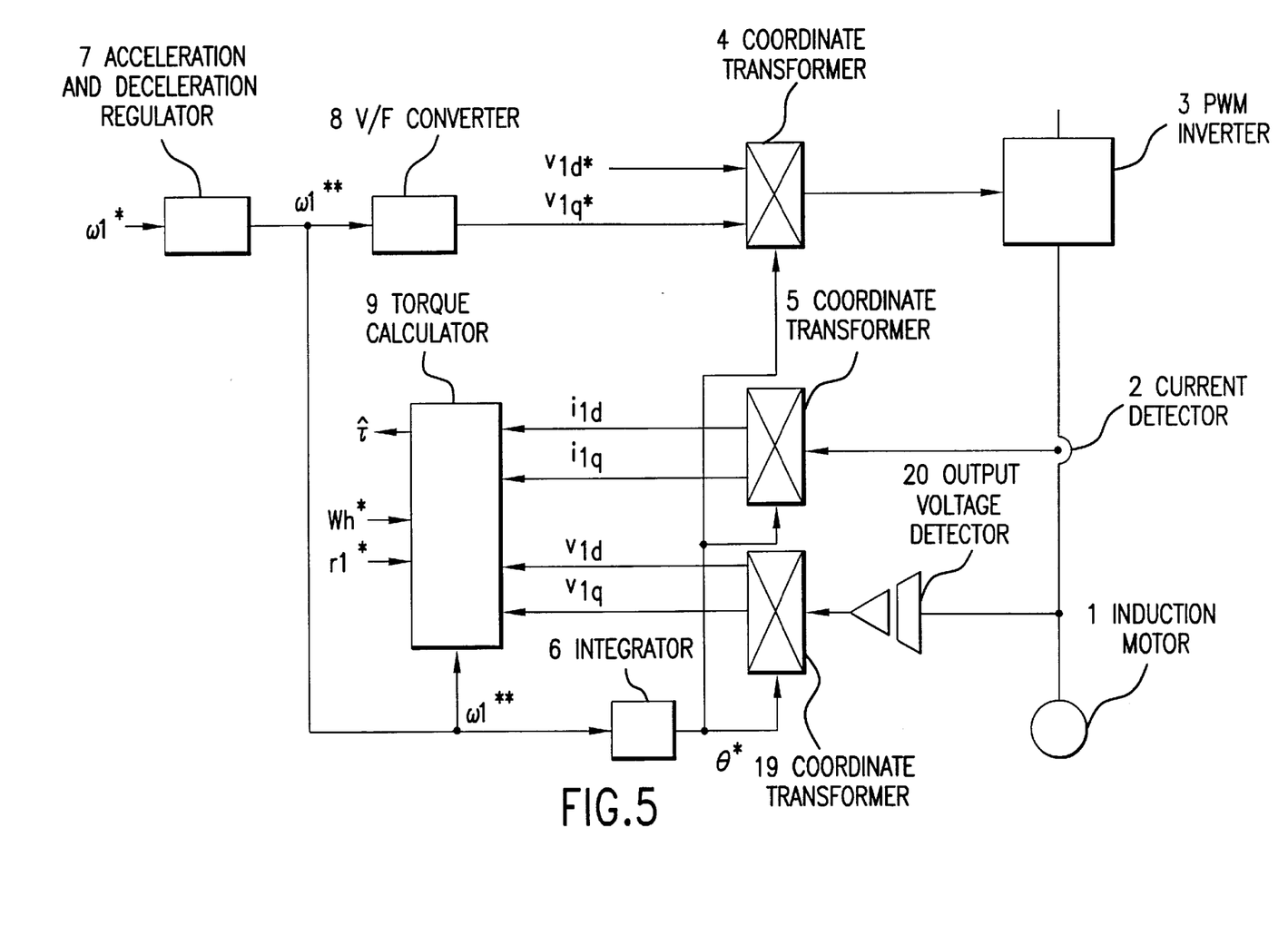
FIG. 5 is a block diagram of another controlling apparatus for controlling an induction motor.
Figure 6:
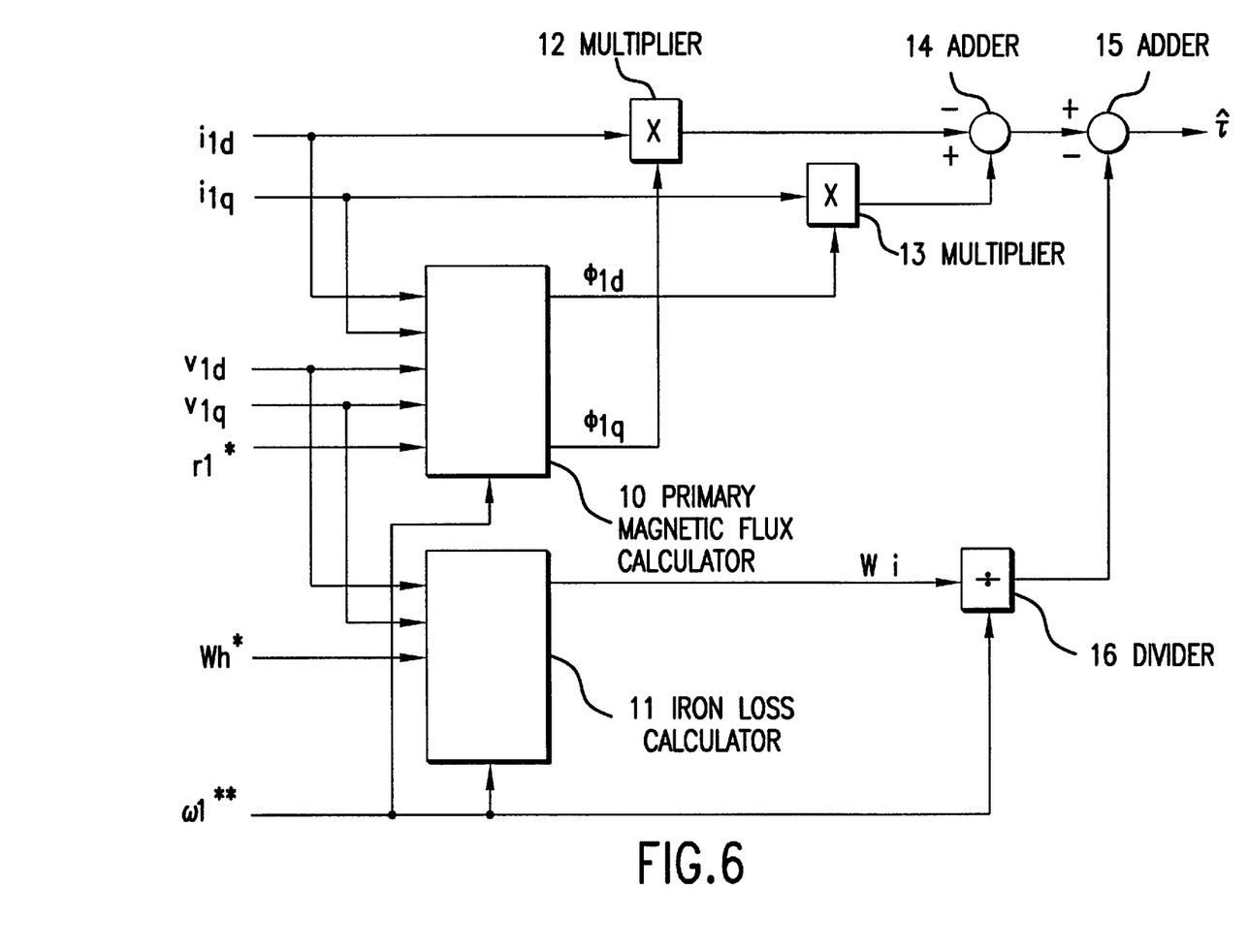
FIG. 6 is a block diagram of a torque calculator for calculating the torque generated by the induction motor in FIG. 5 according to a fourth embodiment of the invention.

FIG. 5 is a block diagram of another controlling apparatus for controlling an induction motor. FIG. 6 is a block diagram of a torque calculator for calculating the torque generated by the induction motor in FIG. 5 according to a fourth embodiment of the invention.

Referring now to FIG. 5, the control apparatus includes an output voltage detector 20 that detects an output voltage of the inverter and a coordinate transformer 19 that resolves the detected output voltage into a q-axis voltage component $v_{1q}$ same in phase as the reference voltage value $v_{1q}^*$ and a d-axis voltage component $v_{1d}$ perpendicular to the reference voltage value $v_{1q}^*$. The control apparatus of FIG. 5 is different from the control apparatus of FIG. 1 in that the control apparatus of FIG. 5 calculates the torque using the detected and resolved voltage components $v_{1d}$ and $v_{1q}$.

Referring now to FIG. 6, the detected and resolved voltage components $v_{1d}$ and $v_{1q}$ are inputted to a primary magnetic flux calculator 10. The primary magnetic flux calculator 10 calculates primary magnetic flux components $\phi_{1d}$ and $\phi_{1q}$ from equations (4a) and (4b), respectively. The other operations are the same as those in the first embodiment.

Since the output voltage values of the inverter are used, the precision of the torque calculation is further improved.

Figure 7:
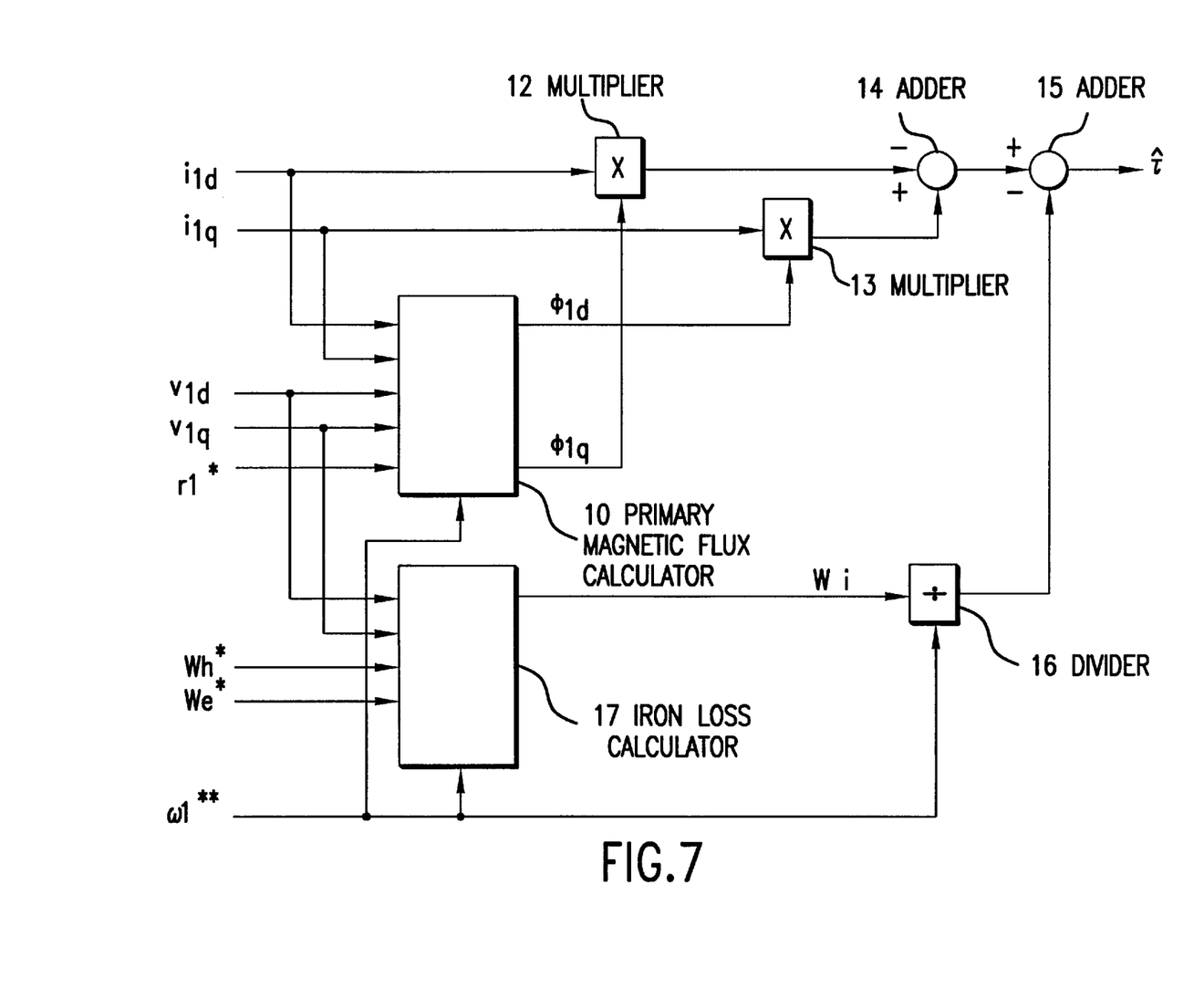
FIG. 7 is a block diagram of a torque calculator for calculating the torque generated by the induction motor according to a fifth embodiment of the invention.

FIG. 7 is a block diagram of a torque calculator for calculating torque generated by the induction motor in FIG. 5 according to a fifth embodiment of the invention.

In the following, the configurations different from those of the second embodiment will be described. In the same manner as in the fourth embodiment, an output voltage detector 20 detects an output voltage of the inverter, and a coordinate transformer 19 resolves the detected output voltage into a q-axis voltage component $v_{1q}$ same in phase with the reference voltage value $v_{1q}^*$ and a d-axis voltage component $v_{1d}$ perpendicular to the reference voltage value $v_{1q}^*$. The torque calculator of FIG. 7 calculates the torque using the detected and resolved voltage components $v_{1d}$ and $v_{1q}$. The configuration of the torque calculator of FIG. 7 is the same as that of FIG. 3 except that the detected and resolved voltage components $v_{1d}$ and $v_{1q}$ are inputted to a primary magnetic flux calculator 10 in FIG. 7.

Figure 8:
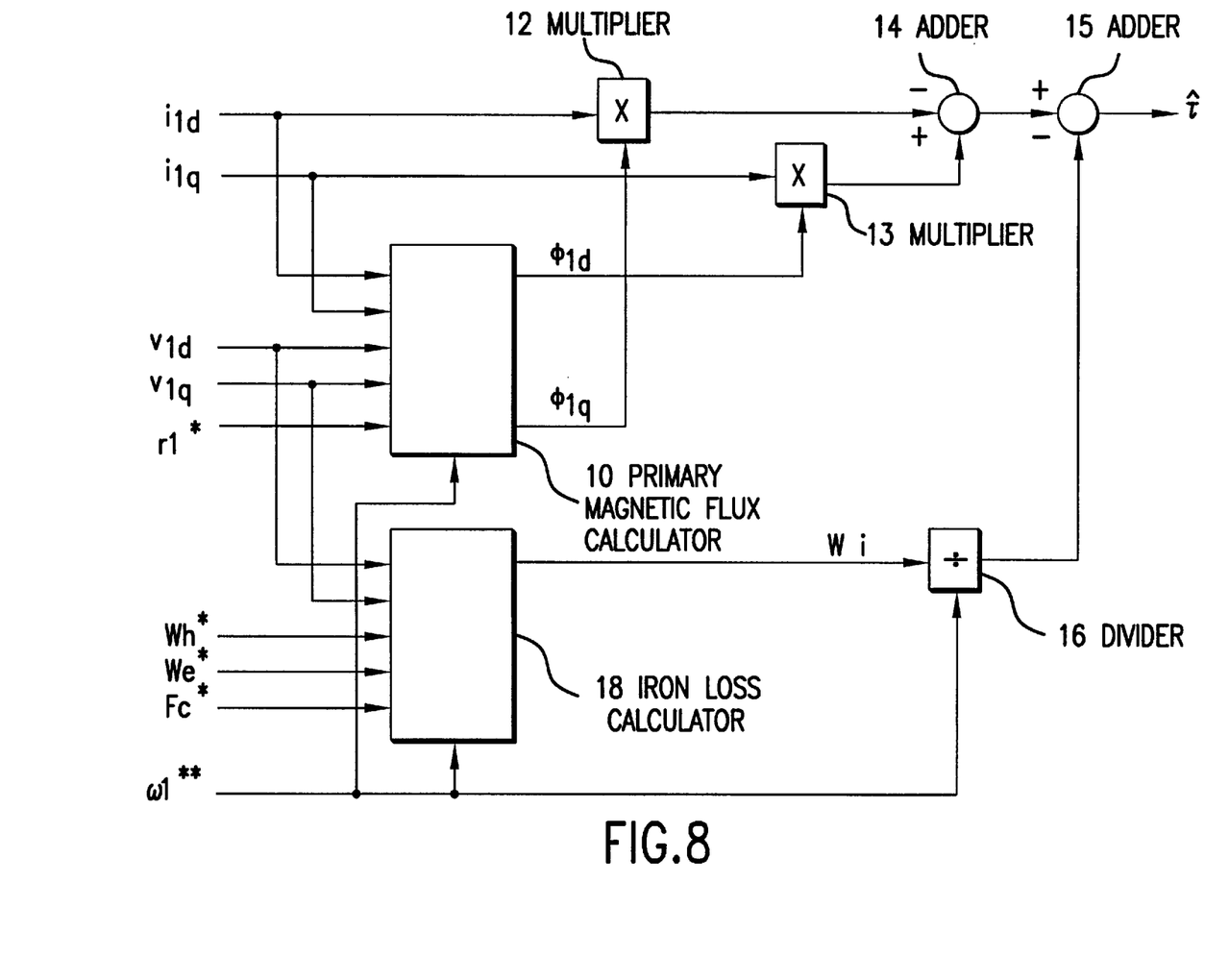
FIG. 8 is a block diagram of a torque calculator for calculating the torque generated by the induction motor according to a sixth embodiment of the invention.

FIG. 8 is a block diagram of a torque calculator for calculating the torque generated by the induction motor according to a sixth embodiment of the invention.

In the following, the configurations different from those of the third embodiment will be described. In the same manner as in the fourth and fifth embodiments, an output voltage detector 20 detects the output voltage of the inverter, and a coordinate transformer 19 resolves the detected output voltage into a q-axis voltage component $v_{1q}$ same in phase with the reference voltage value $v_{1q}^*$ and a d-axis voltage component $v_{1d}$ perpendicular to the reference voltage value $v_{1q}^*$. The torque calculator of FIG. 8 calculates the torque using the detected and resolved voltage components $v_{1d}$ and $v_{1q}$. The configurations of the torque calculator of FIG. 8 are the same as those of FIG. 4 except that the detected and resolved voltage components $v_{1d}$ and $v_{1q}$ are inputted to a primary magnetic flux calculator 10 in FIG. 8.

According to the invention, the torque that an induction motor generates is calculated with no errors even in the boosting state by subtracting the copper and iron losses from the electric power inputted and by dividing the result of the subtraction by the primary angular frequency.

What is claimed is:
1. An apparatus for calculating generated torque of an induction motor with an iron core driven by an inverter, comprising:
   a torque calculating device for calculating a torque of the induction motor including an iron loss caused by a stator core of the induction motor;
   an iron loss calculator for calculating the iron loss of the induction motor based on hysteresis characteristics of the stator core of the induction motor;
   a divider connected to the iron loss calculator, said divider dividing the calculated iron loss by a primary angular frequency for the inverter; and
   an adder connected to the divider and the torque calculating device, said adder subtracting a result of a division of the divider from the torque calculated by the torque calculating device to thereby calculate the generated torque.

2. An apparatus according to claim 1, further comprising means for obtaining a reference voltage value fed to the inverter, means for obtaining a q-axis current component and a d-axis current component resolved from a detected current of the induction motor on a d-q axes rotating coordinate system using as a reference axis a reference vector position obtained by integrating the primary angular frequency, and a primary resistance of the induction motor.

3. An apparatus according to claim 1, wherein said torque calculating device includes a primary magnetic flux calculator for calculating primary magnetic flux components, and a multiplying device connected to the primary magnetic flux calculator and the adder, said multiplying device calculating the primary magnetic flux components and current components and providing a result to the adder.

4. An apparatus according to claim 1, further comprising means for obtaining a q-axis voltage component and a d-axis voltage component resolved from an output voltage of the inverter on a d-q axes rotating coordinate system using as a reference axis a reference vector position obtained by integrating the primary angular frequency, means for obtaining a q-axis current component and a d-axis current component resolved from a detected current of the induction motor on the d-q axes rotating coordinate system, and a primary resistance of the induction motor.

5. An apparatus according to claim 1, wherein said iron loss calculator further calculates an eddy current loss based on characteristics of an eddy current flowing through the stator core of the induction motor and calculates the iron loss using the calculated eddy current loss together with the hysteresis characteristics.

6. An apparatus according to claim 5, wherein the iron loss calculator further calculates a hysteresis loss and an eddy current loss due to a carrier frequency of the inverter and calculates the iron loss using the calculated hysteresis loss and eddy current loss.

* * * * *